(12) United States Patent
Kato et al.

(10) Patent No.: US 6,580,415 B1
(45) Date of Patent: Jun. 17, 2003

(54) INPUT DEVICE OF DETECTING ACCELERATION

(75) Inventors: Katsumi Kato, Fukushima-ken (JP); Yasuji Hagiwara, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 120 days.

(21) Appl. No.: 09/639,481

(22) Filed: Aug. 15, 2000

(30) Foreign Application Priority Data

Aug. 19, 1999 (JP) ............................................ 11-232385

(51) Int. Cl.⁷ ................................................. G09G 5/00
(52) U.S. Cl. ........................ 345/156; 345/157; 345/158; 345/163; 345/167; 345/169
(58) Field of Search ................................ 345/156, 157, 345/158, 163, 169, 167; 463/37, 38

(56) References Cited

U.S. PATENT DOCUMENTS 5,181,181 A * 1/1993 Glynn ........................ 364/566
5,691,898 A * 11/1997 Rosenberg et al. ........... 345/61
6,001,014 A * 12/1999 Ogata et al. .................. 463/37
6,380,923 B1 * 4/2002 Fukumoto et al. .......... 345/156

FOREIGN PATENT DOCUMENTS

JP           6-190144        7/1994

* cited by examiner

Primary Examiner—Matthew C. Bella
Assistant Examiner—Tam Tran
(74) Attorney, Agent, or Firm—Brinks Hofer Gilson & Lione

(57) ABSTRACT

The present invention relates to an input device capable of detecting an acceleration, in which a detecting section constituted by a combination of a weight, a coiled spring, and detecting means is supported by a support. The support is fixed to a tip end within a case of the input device. By applying a force having a predetermined or higher acceleration in W direction with a grip part of the input device as fulcrum, thereby causing the input device to rotate, the weight is moved by the resulting centrifugal force in a direction in which the coiled spring is compressed, and an electric signal outputted from the detecting means varies according to the amount of the movement of the weight. By detecting this variation it is possible to detect an acceleration upon rotation of the input device.

8 Claims, 4 Drawing Sheets

INPUT DEVICE OF DETECTING ACCELERATION

BACKGROUND OF THE INVENTION

1. Field of the Invention

The present invention relates to an input device for use in a domestic game machine, particularly an input device capable of detecting an acceleration.

2. Description of the Prior Art

Acceleration sensors are usually formed as capacitance type sensors or by using a piezoelectric element and are used in various fields, including such automobile-related components as air bags and suspensions, as well as seismometers and anti-theft devices.

Recently, for enhancing a sense of presence and thereby having experience close to the reality, lifelike input devices have come to be used for business use, including simulation.

However, the acceleration sensor used in the above input devices is very expensive and therefore the use thereof in domestic game machines has so far encountered a problem in point of cost. Besides, in comparison with input devices for business use, those for use in domestic game machines are not required to have a very high accuracy, so there has been a problem in using such an expensive acceleration sensor as referred to above.

The use of the expensive acceleration sensor also involves the problem that the structure of internal circuits becomes complicated.

SUMMARY OF THE INVENTION

The present invention has been accomplished for solving the above-mentioned problems and it is an object of the invention to provide an input device of a simple mechanism and capable of being manufactured less expensively.

According to the present invention there is provided an input device wherein an acceleration sensor for detecting an acceleration of a case is disposed within the case, the case being handled by hand, and an output provided from the acceleration sensor is transmitted to a computer or a game machine, characterized in that the acceleration sensor comprises a weight supported by an elastic member and detecting means which causes an electric signal to be varied with a motion of the weight upon an elastic deformation of the elastic member.

This input device can be constructed by combining such simple components as the weight, elastic member, and detecting means, not requiring the use of the expensive acceleration sensor as in the prior art, and can therefore be manufactured less expensively. For this reason, this input device is suitable as an input device not requiring a high accuracy such as an input device in a domestic game machine.

The detecting means used in the present invention may be one which outputs an ON-OFF change-over signal or one which acquires an output varying according to the distance of movement of the weight. In the detecting means which outputs an ON-OFF change-over signal, the result of having detected an acceleration of the case is outputted as a digital value, while in the detecting means which acquires an output varying according to the distance of movement of the weight, the result of having detected an acceleration of the case is outputted as an analog value.

The former detecting means may be a switch adapted to operate and self-reset upon arrival at a predetermined position; for example, it may be such a conventional switch as a mere contact change-over switch or a proximity switch. Also as to the latter detecting means, it is may be a conventional one such as a volume control type which detects a change in resistance.

In the present invention, the weight may be supported by the elastic member so as to be movable in both a first direction and a second direction opposite to the first direction, and there may be used a first detecting means which is operated by movement of the weight in the first direction and a second detecting means which is operated by movement of the weight in the second direction.

With these detecting means, it is possible to make detection in two directions.

The input device according to the present invention may be provided with first and second weights of different masses, a first elastic member which supports the first weight, a second elastic member which supports the second weight, and detecting means which are operated by the first and second weights, respectively, when both weights move in the same direction.

For example, in the case where the mass of the first weight is heavier than that of the second weight and where the same acceleration is applied to both weights, the first detecting means can detect a change in an electric signal earlier than the second detecting means, and by detecting a time difference between such changes it is made possible to detect the acceleration.

Preferably, the first and second elastic members are the same in elastic modulus. By so doing, the acceleration to be outputted can be adjusted by changing only the weight mass.

Alternatively, the mass of the first weight and that of the second weight may be made equal to each other and there may be used elastic members different in elastic modulus.

Preferably, there is used a rotatable input member and the weight is movable in a direction in which a centrifugal force is exerted by the rotating motion of the input member.

For example, in case of an input device whose shape is similar to a bat in baseball, a golf club, or a fishing rod, it is mounted on a tip end of its case, whereby the speed and the instant of impact are detected upon a swing motion of the input device.

The elastic member may be a coiled spring or a member capable of undergoing deflection.

For example, in case of a coiled spring, the coiled spring can be disposed between the weight and the detecting means, whereby the coiled spring is deformed when a force having an acceleration toward the detecting means is applied to the weight, and the detecting means is operated by the weight. In case of a member capable of undergoing deflection, the detecting means is disposed in a deflecting direction with respect to the weight.

BRIEF DESCRIPTION OF THE DRAWINGS

FIGS. 1A and 1B are side views showing a first mode of detecting means used in an input device according to the present invention, in which FIG. 1A shows an OFF state and FIG. 1B shows an ON state;

FIGS. 3A and 3B are side views showing a third mode of detecting means, in which FIG. 3A shows a state free of any change in output and FIG. 3B shows an output varying state;

DETAILED DESCRIPTION OF PREFERRED EMBODIMENTS

Figure 1A:
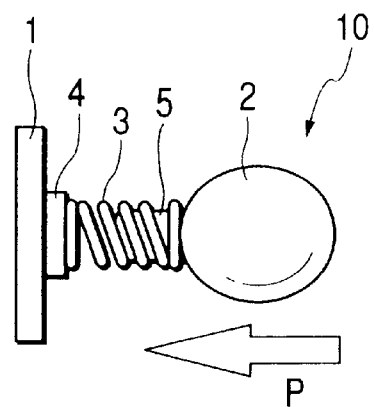
Figure 1B:
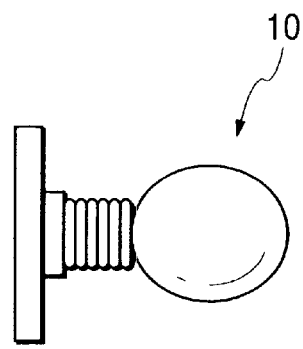
Figure 2:
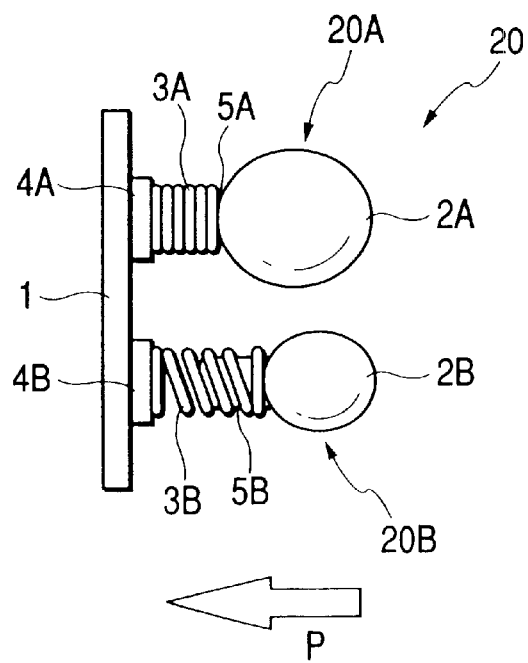
FIG. 2 is a side view showing a second mode of detecting means.
Figure 3A:
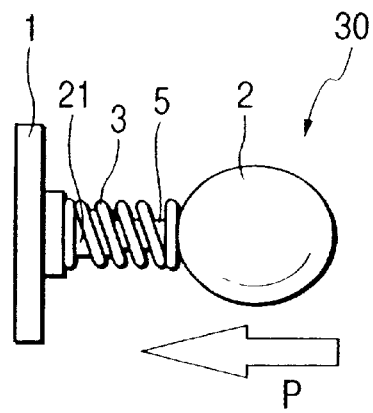
Figure 3B:
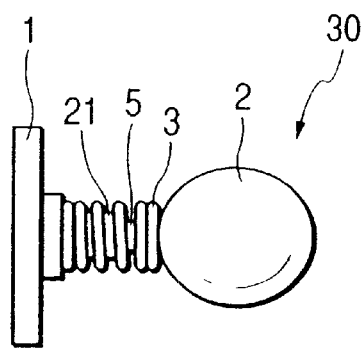
Figure 4:
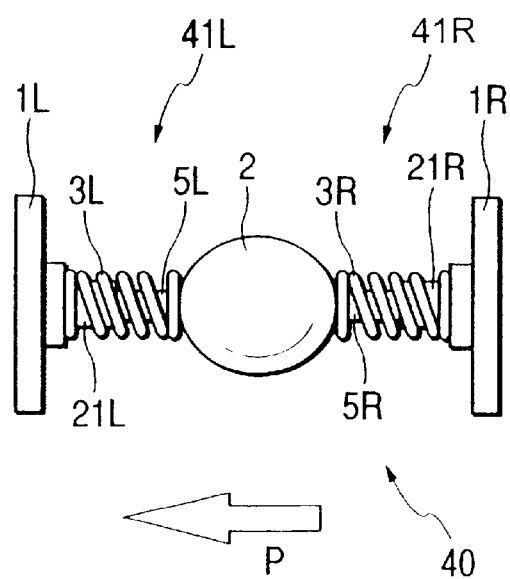
FIG. 4 is a side view showing a fourth mode of detecting means.
Figure 5:
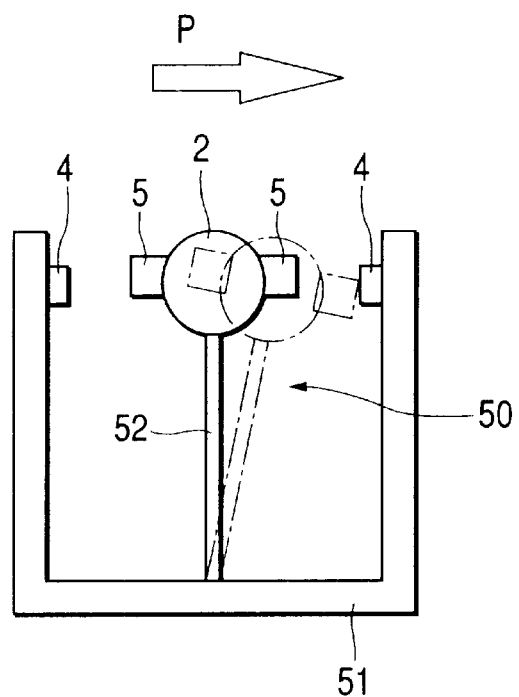
FIG. 5 is a side view showing a fifth mode of detecting means.
Figure 6:
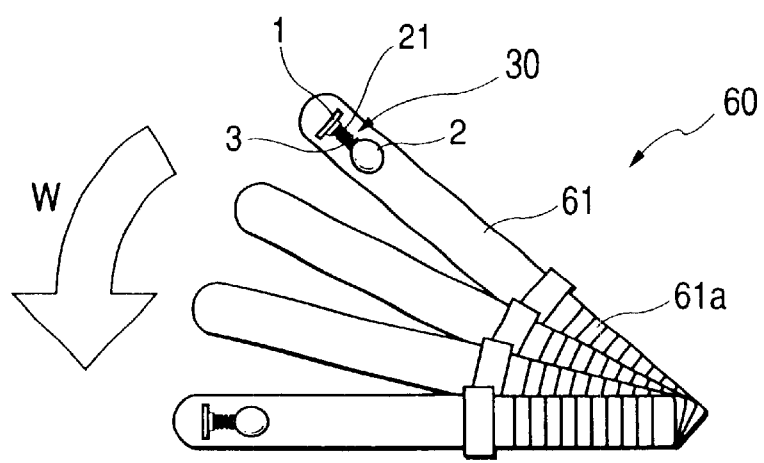
FIG. 6 is a side view showing an example of using an input device according to the present invention and the operation thereof.
Figure 7:
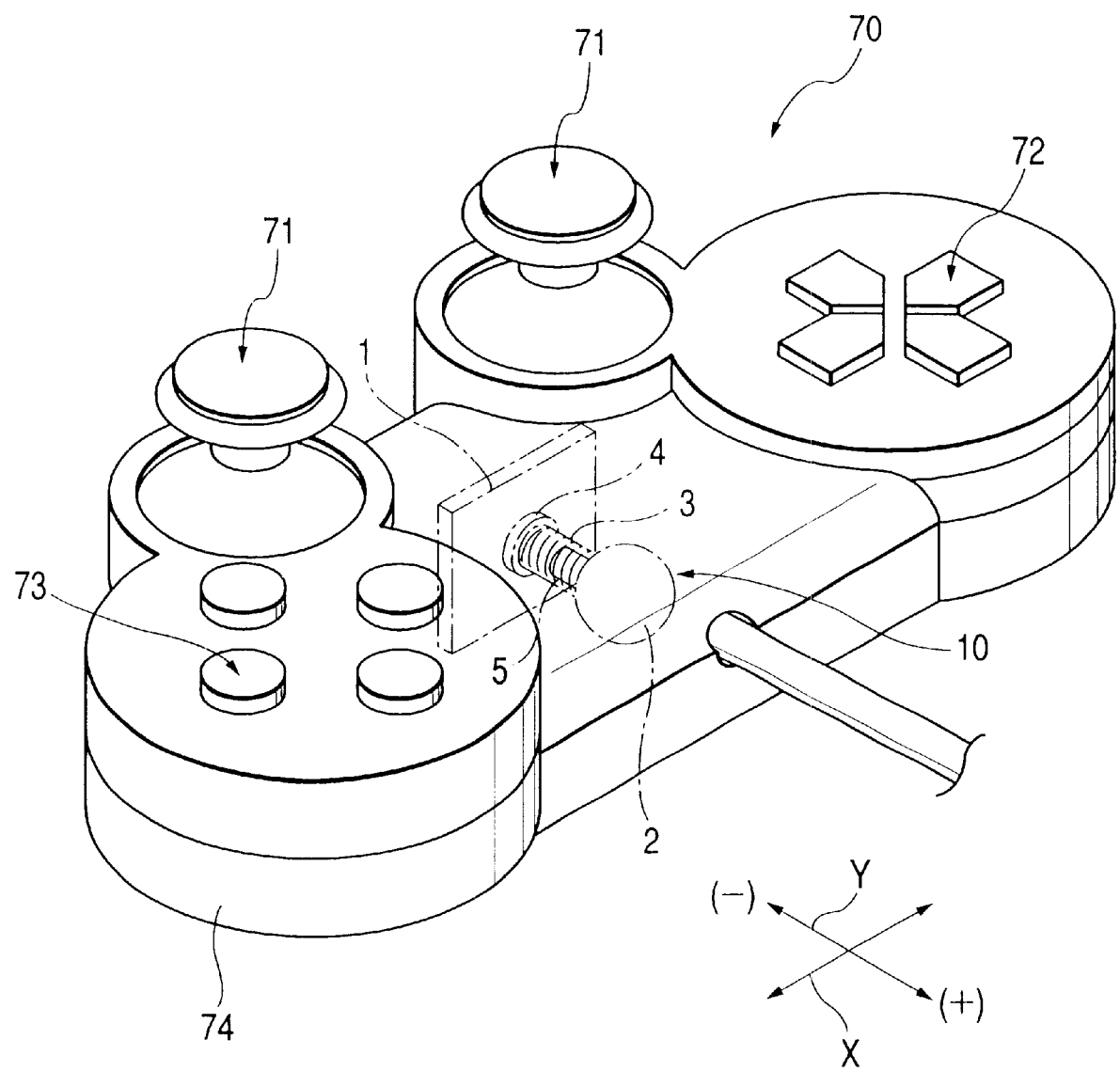
FIG. 7 is a perspective view showing an example of using another input device according to the present invention.

Input devices according to the present invention will be described below with reference to FIGS. 1 to 7. FIGS. 1A and 1B are side views showing a first mode of detecting means used in an input device according to the present invention, in which FIG. 1A shows a switch OFF state and FIG. 1B shows a switch ON state. FIG. 2 is a side view showing a second mode of detecting means. FIGS. 3A and 3B are side views showing a third mode of detecting means, in which FIG. 3A shows a state free of any change in output and FIG. 3B shows a output varying state. FIGS. 4 and 5 are side views showing fourth and fifth modes, respectively, of detecting means, FIG. 6 is a side view showing an input device according to the present invention and the operation thereof, and FIG. 7 is a perspective view showing another input device according to the present invention.

The detecting means shown in FIGS. 1 to 5 are each incorporated into a case of a controller for a domestic game machine such as a game pad so far used or one imitating a bat, sword, golf club, or fishing rod.

A detecting section 10 as detecting means shown in FIG. 1 is constituted by a combination of a spherical weight 2, a coiled spring 3, a switch 4 capable of outputting an ON-OFF change-over signal, and a pressing portion 5 integral with the weight 2. The switch 4 and a base end of the coiled spring 3 are supported by a support 1, with the weight 2 being free. The support 1 is fixed inside the controller case referred to above.

The coiled spring 3 and the weight 2 may be connected together with an adhesive, or by inserting the coiled spring 3 threadedly into the weight 2, or by soldering. Projecting from the weight 2 is the pressing portion 5 which is cylindrical. The pressing portion 5 is fitted in the coiled spring 3 and is spaced a predetermined distance from the switch 4. According to this structure, only when a predetermined or higher acceleration is exerted in the switch 4 direction (arrow P direction) on the weight 2 and the force imposed on the weight 2 in the same direction has overcome the urging force of the coiled spring 3, the coiled spring 3 contracts and the switch 4 turns from OFF (FIG. 1A) to ON (FIG. 1B). Thus, upon exertion of the predetermined or higher acceleration on the case, this state can be detected in terms of an ON output.

In a detecting section shown in FIG. 2, detecting units 20A and 20B, which comprise weights 2A and 2B, respectively, different in mass, are provided on a support 1. As in the detecting section 10, the detecting units 20A and 20B are respectively made up of weights 2A, 2B, coiled springs 3A, 3B, switches 4A, 4B, and pressing portions 5A, 5B, and are arranged side by side.

In the detecting section 20, the mass of the weight 2A is larger than that of the weight 2B. When an acceleration which is more than a predetermined acceleration is exerted in arrow P direction on the weights 2A and 2B, the force in P direction imposed on the coiled spring 3A by the weight 2A of the higher mass becomes larger than the force in P direction imposed on the coiled spring 3B by the weight 2B of the lower mass. Therefore, the coiled spring 3A is the first to contract and the switch 4A is turned ON by the pressing portion 5A of the weight 2A, followed by contraction of the coiled spring 3B and turning ON of the switch 4B by the pressing portion 5B of the weight 2B.

When the weights 2A and 2B revert to the respective original positions, since the coiled springs 3A and 3B are almost equal in elastic modulus and the mass of the weight 2B is the smaller, the pressing portion 5B of the weight 2B is the first to leave the switch 4B with the restoring force of the coiled spring 3B and the switch 4B is turned OFF. Thereafter, the pressing portion 5A of the weight 2A leaves the switch 4A, so that the switch 4A is turned OFF.

Thus, when an acceleration is given in P direction, the switches 4A and 4B turn ON in this order and thereafter the switches 4B and 4A turn OFF in this order. At this time, an ON-to-ON time difference between the switches 4A and 4B and an OFF-to-OFF time difference between the two vary depending on the magnitude of acceleration applied to the case (weights). Accordingly, by measuring such time differences it is possible to detect the magnitude of acceleration.

In a detecting section 30 shown in FIG. 3, the output of detecting means 21 varies according to the distance of movement of a weight 2, unlike the switch 4 described above. Other portions are the same as in the previous detecting sections 10 and 20. When a coiled spring 3 is in its original state, a tip end of the detecting means 21 and a pressing portion 5 are in abutment with each other.

The detecting means 21 provided in the detecting section 30 may be, for example, one using a slide volume control or one using an encoder so as to be capable of detecting a moving motion of the pressing portion 5, or may be one wherein the resistance value varies upon pushing the tip end of the detecting means 21 by the pressing portion 5.

In the detecting section 30, when a predetermined force is applied in P direction to the weight 2 in the state shown in FIG. 3A, the tip end of the detecting means 21 is pushed by the pressing portion 5, with consequent change in output (FIG. 3B). A maximum value of the output or a variation in output per unit time varies according to the magnitude of acceleration applied to the weight 2. That is, the magnitude of acceleration can be detected by detecting a maximum value of detected output provided from the detecting means 21 or by detecting the amount of variation per unit time.

In a detecting section 40 shown in FIG. 4, a single weight 2 is used and detecting units 41L and 41R are disposed opposedly to each other on both sides of the weight 2.

Other portions of the detecting units 41L and 41R are the same as in the detecting section 30 shown in FIG. 3. Both detecting units are respectively made up of coiled springs 3L, 3R, detecting means 21L, 21R, and pressing portions 5L, 5R, and are supported by supports 1L and 1R. According to this structure, the weight 2 can move linearly in two directions. The detecting means 21L and 21R may be switches which turn from OFF to ON upon abutment of the pressing portions 5L and 5R thereagainst, as shown in FIG. 1, or may be volume controls in which output varies depending on the amount of movement of the weight 2 (pressing portion 5). The material of the coiled spring 3L and that of the coiled spring 3R are of the same elastic modulus.

In the detecting section 40, when a force having a certain or higher acceleration is applied in P direction to the weight 2, the coiled spring 3L is compressed by the weight 2 and the detecting means 21L is pushed by the pressing portion 5L. By detecting the resulting switch-ON, or if a variable output is obtained, by detecting the amount of variation in output per unit time, the acceleration applied to the case is detected.

Also in the case where a force is applied to the weight 2 in the direction opposite to the above direction, it is possible to detect acceleration. That is, in the detecting means shown in FIG. 4, it is possible to detect accelerations in both P direction and the direction opposite thereto.

In a detecting section 50 shown in FIG. 5 there is used an elastic member capable of undergoing deflection, not the coiled spring 3 described above.

The detecting section 50 is constituted by an assembly of a weight 2, a flexible member 52, a pair of pressing portions 5, and a pair of switches 4, which assembly is supported by a concave support 51.

The flexible member 52 is erected vertically on the support 51, with one end thereof being secured to a bottom of the support 51 and with the weight 2 secured to an opposite end of the flexible member. The flexible member 52 is not specially limited insofar as it can undergo deflection, e.g., a plate spring or a rod. The pressing portions 5 are disposed at opposed positions on both sides of the weight 2, and the switches 4 are disposed at vertical positions corresponding to the pressing portions 5 of the support 51.

Although the switches 4 shown in FIG. 5 are digital switches which output an ON-OFF change-over signal, there may be used the foregoing detecting means 21 whose output varies according to the amount of movement of the weight 2 and which outputs an analog signal. The elastic modulus of the flexible member 52, the distance between each switch 4 and each pressing portion 5, and a contact inclination between each switch 4 and each pressing portion 5 may be changed as necessary. The detecting means may be provided on only one side, and as the flexible member 52 there may be used a rigid member which does not undergo deflection and which is supported pivotably by the support 51.

In the detecting section 50, when a predetermined moving force is applied to the weight 2 in arrow P direction in FIG. 5, the flexible member 52 deflects as indicated with a dot-dash line in the figure and the switch 4 located on the deflected side is pressed by the associated pressing portion 5 and is turned ON.

The detecting section 50 may be constructed as in FIG. 2, in which detecting units having weights 2 of different masses are arranged side by side to permit the detection of acceleration.

Above described detecting unit 10 or 50 as detecting means can be mounted on a controller of a domestic game machine.

In FIG. 6, the detecting section 30 described earlier is mounted on a sword-like case 61 of an input device (controller) 60.

As shown in the same figure, the detecting section 30 is disposed at a tip portion of the case 61 in such a manner that the weight 2 in the detecting section 30 can move toward the tip end (a centrifugal force acting direction) of the case 61.

For operation of the detecting section 30, an operator grasps a controller grip part 61a of the case 61 and causes the case to perform a centrifugal motion in arrow W direction with the grip part 61a side as fulcrum, whereby a moving force is applied to the tip of the case 61 and hence to the weight 2. At this time, in the detecting means 21 (an ON-OFF switch or a volume control which affords an output varying according to the amount of pushing), the output varies according to the amount of movement of the weight 2, and a conversion is made into a rotational acceleration on the basis of a relation between changes in the output and the time.

The controller 60 is employable, for example, in a game which aims at throwing down a man or the like by a swing motion of the controller. In this case, the degree of a damage to the object can be varied according to the acceleration which is generated with a swing motion of the controller.

In an input device 70 shown in FIG. 7, the detection section 10 described earlier is mounted on a case 74 of a conventional pad type controller.

The input device 70 is provided with operating buttons 72 and 73 which output an ON-OFF change-over signal and a pair of operating portions 71 of, for example, a volume control type which are supported pivotably and whose outputs vary depending on the direction and angle of inclination.

In the detecting section 10, the weight 2 is supported so as to be movable longitudinally (in Y-axis directions). For example, when the whole of the input device 70 is moved acceleratively in Y-axis (+) direction, the coiled spring 3 is compressed and the switch 4 is turned ON and OFF by the pressing portion 5.

Thus, an ON-OFF change-over signal is outputted when the input device 70 is pushed forward, whereby it can be converted, for example, into a motion of pushing an object displayed on a screen in one scene of a gaming operation. By repeating this converting operation it is possible to move the object continuously.

The direction of movement of the input device 70 in the detecting operation is not limited to such one direction as above. The detecting section 40 shown in FIG. 4 may be used so that detection can be made in two longitudinal (Y-axis) directions, or the detection section 40 may be disposed not only in Y-axis directions but also in two X-axis directions to permit detection in a total of four directions, or any other detector may be used. Thus, modifications may be made as necessary according to the input device and software used.

The present invention is not limited to the above embodiments. For example, a detecting section according to the present invention may be mounted on a bat or a golf club to detect a head speed or the instant of impact. Where it is mounted on a fishing rod, a bait flying distance may be changed according to the speed of rod swing.

In the present invention, as set forth above, an acceleration sensor can be constituted by a simple mechanism alone and therefore can be provided as a less expensive input device. The input device is useful particularly as a controller not requiring a high accuracy such as that used in a domestic game machine.

What is claimed is:

1. An input device comprising:
   a case;
   an acceleration sensor to detect an acceleration of the case, the acceleration sensor disposed within the case, the case being handled by hand; and
   an output provided from the acceleration sensor transmitted to one of a computer and a game machine,
   wherein the acceleration sensor comprises a first weight and a second weight which are different in mass, the first weight supported by a first elastic member, a second elastic member which supports the second weight, and detecting means that cause an electric signal to be varied with motion of the first and second weights upon an elastic deformation of the respective elastic member and are operated by the first and second weight, respectively, when the first and second weights move in the same direction.

2. An input device according to claim 1, wherein the detecting means outputs an ON-OFF change-over signal.

3. An input device according to claim 1, wherein the detecting means obtain an output which varies according to a distance of movement of the first and second weights.

4. An input device according to claim 1, wherein the first and second weights are movable in both a first direction and a second direction opposite thereto, and which comprises a first detecting means to be operated by movement of the first and second weights in the first direction and a second detecting means to be operated by movement of the first and second weights in the second direction.

5. An input device according to claim 1, wherein the first and second elastic members are the same in elastic modulus.

6. An input device according to claim 1, wherein a rotatable input member is provided and the first and second weights are movable in a direction in which a centrifugal force is exerted by a rotating motion of the input member.

7. An input device according to claim 1, wherein the elastic member is a coiled spring.

8. An input device according to claim 1, wherein the elastic member is capable of undergoing deflection.

* * * * *

UNITED STATES PATENT AND TRADEMARK OFFICE
CERTIFICATE OF CORRECTION

PATENT NO. : 6,580,415 B1
DATED : June 17, 2003
INVENTOR(S) : Katsumi Kato et al.

It is certified that error appears in the above-identified patent and that said Letters Patent is hereby corrected as shown below:

<u>Title page, Item [54] and Column 1, line 1,</u>
After "DEVICE" insert -- CAPABLE --.

Signed and Sealed this

Thirtieth Day of December, 2003

JAMES E. ROGAN
*Director of the United States Patent and Trademark Office*